United States Patent
Hatano et al.

(10) Patent No.: US 11,614,018 B2
(45) Date of Patent: Mar. 28, 2023

(54) EXHAUST PASSAGE STRUCTURE OF INTERNAL COMBUSTION ENGINE

(71) Applicant: TOYOTA JIDOSHA KABUSHIKI KAISHA, Toyota (JP)

(72) Inventors: Takato Hatano, Seto (JP); Masakazu Tabata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/643,223

(22) Filed: Dec. 8, 2021

(65) Prior Publication Data

US 2022/0178297 A1 Jun. 9, 2022

(30) Foreign Application Priority Data

Dec. 9, 2020 (JP) .............................. JP2020-204237

(51) Int. Cl.
*F01N 13/10* (2010.01)
*F02D 13/02* (2006.01)
*F01L 1/08* (2006.01)

(52) U.S. Cl.
CPC .......... *F01N 13/10* (2013.01); *F01N 13/107* (2013.01); *F02D 13/0246* (2013.01); *F01L 1/08* (2013.01); *F01N 2470/20* (2013.01)

(58) Field of Classification Search
CPC .......... F01L 1/08; F01N 13/10; F01N 13/107; F01N 2470/20
USPC ................................................... 60/280, 323
See application file for complete search history.

(56) References Cited

U.S. PATENT DOCUMENTS

| | | | | |
|---|---|---|---|---|
| 3,180,077 | A * | 4/1965 | Berchtold | F02B 37/02 60/314 |
| 5,606,942 | A * | 3/1997 | Tsuzuku | F01L 1/265 123/90.6 |
| 2004/0194463 | A1* | 10/2004 | Yanagisawa | F02B 37/004 60/605.2 |
| 2005/0028523 | A1 | 2/2005 | Nishiyama et al. | |
| 2005/0247058 | A1* | 11/2005 | Pedersen | F02B 37/02 60/599 |

(Continued)

FOREIGN PATENT DOCUMENTS

| | | |
|---|---|---|
| JP | 2005-016313 A | 1/2005 |
| JP | 2007-064099 A | 3/2007 |

*Primary Examiner* — Jorge L Leon, Jr.
(74) *Attorney, Agent, or Firm* — Oblon, McClelland, Maier & Neustadt, L.L.P.

(57) ABSTRACT

An exhaust passage structure of an internal combustion includes a first merging passage, a second merging passage, and a third merging passage connecting a third gathering portion in which the exhaust gas flowing through the first merging passage and the exhaust gas flowing through the second merging passage gather and a turbine of a turbocharger. The first merging passage and the second merging passage have respective narrowed portions in which passage cross-sectional areas are minimized. When a total value of passage cross-sectional areas of inlets of exhaust ports in one cylinder is set as a reference passage cross-sectional area A, and the passage cross-sectional areas of the narrowed portions of the first merging passage and the second merging passage are set as narrowed cross-sectional areas B, the exhaust passage structure is configured such that the relationship of $0.5 \leq (B/A) \leq 1$ is established.

6 Claims, 5 Drawing Sheets

(56) References Cited

U.S. PATENT DOCUMENTS

| | | | | |
|---|---|---|---|---|
| 2010/0251704 A1* | 10/2010 | Asame | ................ | F02F 1/4264 |
| | | | | 60/323 |
| 2011/0023482 A1* | 2/2011 | Styles | .................. | F02M 26/08 |
| | | | | 60/297 |
| 2013/0283787 A1* | 10/2013 | Sakata | .............. | F02D 41/1456 |
| | | | | 60/605.1 |
| 2014/0260193 A1* | 9/2014 | Moravec | ................ | F01N 3/021 |
| | | | | 60/311 |
| 2015/0184619 A1* | 7/2015 | Wang | .................. | F01N 13/107 |
| | | | | 123/568.11 |
| 2015/0308369 A1* | 10/2015 | Kodama | .............. | F02F 1/4264 |
| | | | | 123/193.5 |
| 2017/0152781 A1* | 6/2017 | Free | .................... | F01N 13/011 |
| 2019/0032536 A1* | 1/2019 | Mohr | ................... | F01N 13/107 |
| 2021/0062745 A1* | 3/2021 | Russ | .................. | F02D 41/0052 |

\* cited by examiner

EXHAUST PASSAGE STRUCTURE OF INTERNAL COMBUSTION ENGINE

CROSS-REFERENCE TO RELATED APPLICATION

This application claims priority to Japanese Patent Application No. 2020-204237 filed on Dec. 9, 2020, incorporated herein by reference in its entirety.

BACKGROUND

1. Technical Field

The present disclosure relates to an exhaust passage structure of an internal combustion engine, and more particularly to an exhaust passage structure of an internal combustion engine provided with a turbocharger through which exhaust gas from two cylinder groups circulates.

2. Description of Related Art

Japanese Unexamined Patent Application Publication No. 2005-016313 (JP 2005-016313 A) discloses a technique relating to a turbocharger that makes exhaust interference less likely to occur. In this technique, in an engine provided with a turbocharger that includes a diffuser at an inlet of a turbine, a passage cross-sectional area of a merging portion where exhaust passages from two cylinder groups merge is set to 50% to 80% of a passage cross-sectional area of an inlet of a turbine scroll, so that dynamic pressure can be efficiently converted to static pressure while suppressing the exhaust interference.

SUMMARY

Generally, the passage cross-sectional area of the inlet of the turbine scroll is slightly larger than the passage cross-sectional area at the inlet of the exhaust port of one cylinder. Therefore, in the technique of JP 2005-016313 A, the passage cross-sectional area of the merging portion of the exhaust passages from the two cylinder groups may be extremely smaller than the passage cross-sectional area of the inlet of the exhaust port of one cylinder. As a result, cylinder pressure in an exhaust stroke becomes high, and exhaust loss and residual gas increase, which leads to a decrease in output and a deterioration in fuel efficiency.

The present disclosure has been made in view of the above, and an object of the present disclosure is to provide, in an internal combustion engine provided with a turbocharger through which exhaust gas from two cylinder groups circulates, an exhaust passage structure in which a decrease in output and deterioration in fuel efficiency can be suppressed while suppressing the exhaust interference.

In order to solve the above problem, a first disclosure is applied to an exhaust passage structure of an internal combustion engine provided with a turbocharger. The internal combustion engine includes a first cylinder group that includes a plurality of cylinders and a second cylinder group that includes a plurality of cylinders different from the cylinders included in the first cylinder group. The exhaust passage structure includes a first multiple branch passage including a plurality of first branch passages each connected to an exhaust side of each of the cylinders in the first cylinder group, and a first gathering portion in which exhaust gas flowing through the first branch passages gathers in one location; a first merging passage extending from the first gathering portion to an exhaust downstream side; a second multiple branch passage including a plurality of second branch passages each connected to an exhaust side of each of the cylinders in the second cylinder group, and a second gathering portion in which exhaust gas flowing through the second branch passages gathers in one location; a second merging passage extending from the second gathering portion to an exhaust downstream side; and a third merging passage connecting a third gathering portion in which the exhaust gas flowing through the first merging passage and the exhaust gas flowing through the second merging passage gather and a turbine of the turbocharger. The first merging passage and the second merging passage have respective narrowed portions in which passage cross-sectional areas are minimized. The exhaust passage structure is configured such that when a total value of passage cross-sectional areas of inlets of one or more exhaust ports in one of the cylinders in the internal combustion engine is set as a reference passage cross-sectional area, and the passage cross-sectional areas of the narrowed portions of the first merging passage and the second merging passage are set as narrowed cross-sectional areas, a ratio of each of the narrowed cross-sectional areas to the reference passage cross-sectional area is included in a range of 0.5 or more to 1.0 or less.

A second disclosure further has the following characteristics in the first disclosure. The exhaust passage structure is configured such that the ratio of each of the narrowed cross-sectional areas to the reference passage cross-sectional area is included in a range of 0.7 or more and 1.0 or less.

A third disclosure further has the following characteristics in the first or second disclosure. An inlet cross-sectional area of an inlet of a turbine scroll of the turbine is configured to be larger than the reference passage cross-sectional area.

A fourth disclosure further has the following characteristics in any one of the first to third disclosures. The narrowed portions of the first merging passage and the second merging passage are provided in respective exhaust downstream ends of the first merging passage and the second merging passage.

A fifth disclosure further has the following characteristics in any one of the first to fourth disclosures. The first merging passage and the second merging passage are configured such that the passage cross-sectional areas are gradually reduced from an exhaust upstream side toward the narrowed portions.

A sixth disclosure further has the following characteristics in any one of the first to fifth disclosures. The internal combustion engine is configured such that a lift speed of an exhaust valve on an opening side is slower than a lift speed of the exhaust valve on a closing side.

A seventh disclosure further has the following characteristics in any one of the first to sixth disclosures. The internal combustion engine is configured such that a maximum lift position of an exhaust valve is on a closing side with respect to an intermediate position between a valve opening start position and a valve closing completion position of the exhaust valve.

When the ratio of the narrowed cross-sectional area to the reference passage cross-sectional area is extremely reduced in order to suppress exhaust interference, the exhaust pipe pressure on the exhaust upstream side of the narrowed portion becomes too high, resulting in an increase in exhaust loss. According to the present disclosure, by setting the ratio of the narrowed cross-sectional area with respect to the reference passage cross-sectional area to the range of 0.5 or more and 1.0 or less, it is possible to suppress the exhaust loss while suppressing the exhaust interference. As a result, it is possible to suppress a decrease in output of the internal combustion engine and a deterioration in fuel efficiency.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment of the present disclosure will be described below with reference to the drawings. Note that when the number such as the quantity, the amount, and the range of each element is referred to in the embodiment shown below, the present disclosure is not limited to the number that has been referred to, except when explicitly stated or clearly specified by the number in principle. In addition, the structures and the like described in the embodiment shown below are not necessarily essential for the present disclosure, except when explicitly stated or clearly specified by the structures in principle.

Embodiment

1. Configuration of Internal Combustion Engine of Embodiment

Figure 1:
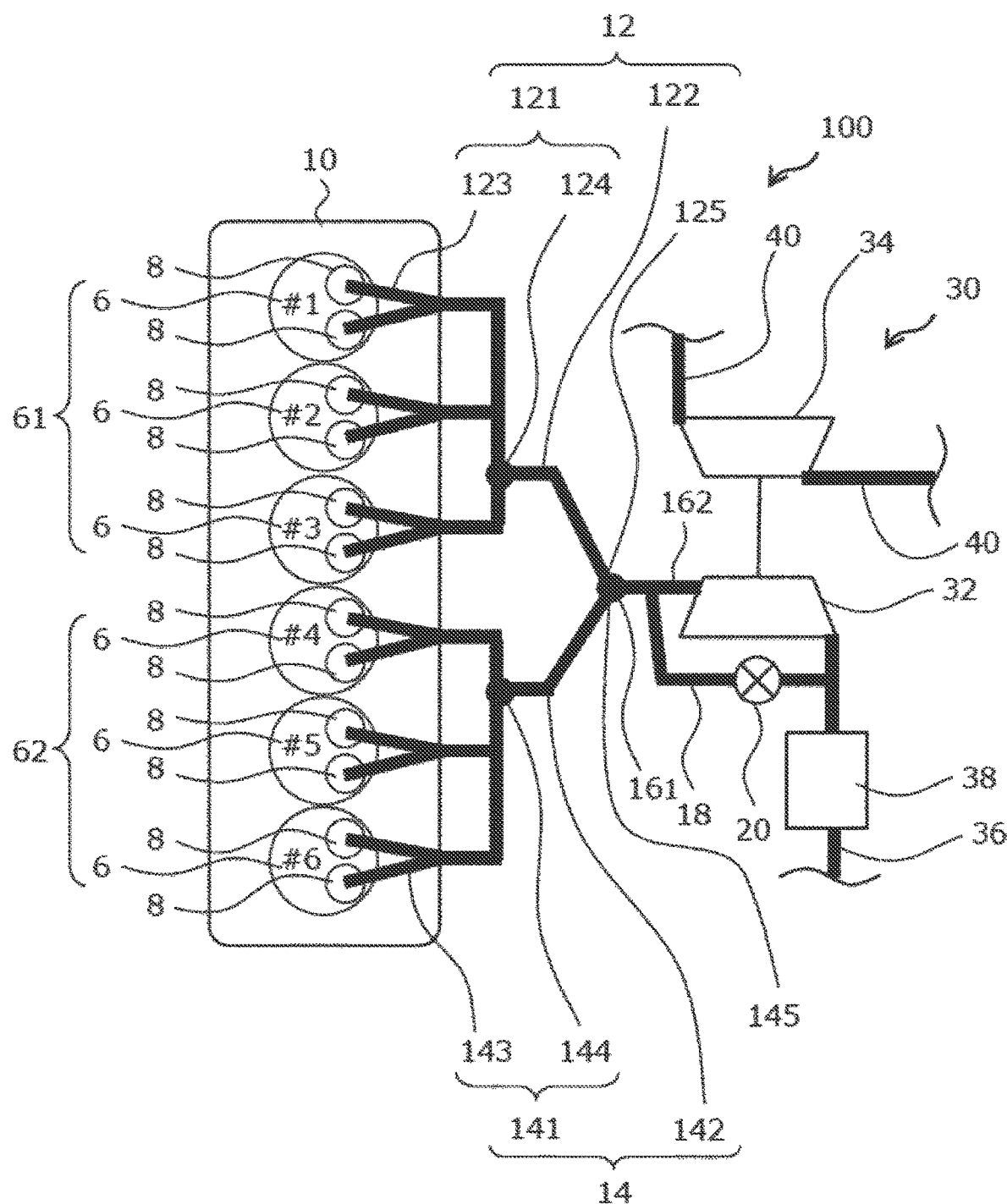
FIG. 1 is a schematic view illustrating an exhaust passage structure of an internal combustion engine according to an embodiment.

FIG. 1 is a schematic view illustrating an exhaust passage structure of an internal combustion engine according to an embodiment. The internal combustion engine 100 according to the embodiment includes six cylinders 6, and is configured as a straight-six engine in which combustion is repeated in the order of a first cylinder #1, a fifth cylinder #5, a third cylinder #3, a sixth cylinder #6, a second cylinder #2, and a fourth cylinder #4. An intake passage 40 is connected to an engine body 10 of the internal combustion engine 100 via an intake manifold (not shown). An intercooler and a throttle valve (both not shown) are provided in the middle of the intake passage 40.

The internal combustion engine 100 is provided with a turbocharger 30. The turbocharger 30 includes a turbine 32 that is operated by energy of exhaust gas of the internal combustion engine 100, and a compressor 34 that is driven by the turbine 32. The intake passage 40 described above is connected to the compressor 34. Intake air can be compressed by the compressor 34.

Each of the six cylinders 6 of the engine body 10 is classified into a first cylinder group 61 and a second cylinder group 62 that are composed of a plurality of cylinders whose exhaust order is not continuous. Specifically, the first cylinder group 61 is composed of three cylinders that are the first cylinder #1, the second cylinder #2, and the third cylinder #3, and the second cylinder group 62 is composed of three cylinders that are the fourth cylinder #4, the fifth cylinder #5 and the sixth cylinder #6. Two exhaust ports communicate with an upper part of each cylinder 6, and an exhaust valve 8 is provided in each exhaust port. The two exhaust ports of each cylinder 6 merge inside a cylinder head.

An exhaust side of the cylinders 6 in the first cylinder group 61 is connected to a first exhaust passage 12. The first exhaust passage 12 includes a first multiple branch passage 121 and a first merging passage 122. The first multiple branch passage 121 includes first branch passages 123 that each include an exhaust port extending from each of the cylinders 6 in the first cylinder group 61, and a first gathering portion 124 in which these first branch passages 123 gather. An exhaust upstream side of the first merging passage 122 is connected to the first gathering portion 124.

Similarly, the exhaust side of the cylinders 6 in the second cylinder group 62 is connected to a second exhaust passage 14. The second exhaust passage 14 includes a second multiple branch passage 141 and a second merging passage 142. The second multiple branch passage 141 includes second branch passages 143 that each include an exhaust port extending from each of the cylinders 6 in the second cylinder group 62, and a second gathering portion 144 in which these second branch passages 143 gather. An exhaust upstream side of the second merging passage 142 is connected to the second gathering portion 144.

An exhaust downstream side of the first merging passage 122 and an exhaust downstream side of the second merging passage 142 are gathered at a third gathering portion 161. An exhaust upstream side of a third merging passage 162 is connected to the third gathering portion 161. The turbine 32 of the turbocharger 30 is connected to an exhaust downstream side of the third merging passage 162. A passage cross-sectional area of the third merging passage 162 is larger than passage cross-sectional areas of the first merging passage 122 and the second merging passage 142.

The exhaust gas that has passed through the turbine 32 circulates through an exhaust passage 36. A catalyst 38 for controlling the exhaust gas is provided in the middle of the exhaust passage 36. Further, a bypass pipe 18 and a wastegate valve (WGV) 20 for bypassing the turbine 32 and allowing the exhaust gas to circulate through the exhaust passage 36 are connected to the upstream side of the catalyst 38 of the exhaust passage 36 and the third merging passage 162.

2. Features of Internal Combustion Engine of Embodiment

As in the exhaust passage structure of the internal combustion engine 100 according to the embodiment, when the exhaust passage structure is configured such that the exhaust gas from the first cylinder group 61 and the second cylinder group 62 is gathered in the third merging passage 162 and then circulated through the common turbine 32, a deterioration of output performance due to exhaust interference may become a problem.

As a measure for suppressing the exhaust interference, for example, it is known to reduce the passage cross-sectional area of the exhaust pipe. However, when the passage cross-sectional area of the exhaust pipe is extremely reduced, the exhaust pipe pressure may become too high on the exhaust upstream side of the passage having a small passage cross-sectional area under the condition that the exhaust gas flow rate is large. As a result, the exhaust loss increases and the residual gas in the cylinder increases in the cylinder 6, resulting in a decrease in output and a deterioration in fuel efficiency.

The exhaust passage structure of the internal combustion engine 100 according to the embodiment has a characteristic configuration for improving output performance while suppressing the exhaust interference. That is, the internal combustion engine 100 according to the embodiment includes a first narrowed portion 125 in the first merging passage 122 and a second narrowed portion 145 in the second merging passage 142. The first narrowed portion 125 and the second narrowed portion 145 are narrowed portions configured such that the passage cross-sectional area is minimized in each of the first merging passage 122 and the second merging passage 142. In the internal combustion engine 100 according to the embodiment, the first narrowed portion 125 and the second narrowed portion 145 are provided in an exhaust downstream end of the first merging passage 122 and the second merging passage 142 (that is, the third gathering portion 161).

Further, when a total value of a passage cross-sectional area of an inlet of the exhaust port of one cylinder (that is, the exhaust upstream end of the first branch passage 123) is set as a reference passage cross-sectional area A, and the passage cross-sectional area of the first narrowed portion 125 of the first merging passage 122 and the passage cross-sectional area of the second narrowed portion 145 of the second merging passage 142 are each set as a narrowed cross-sectional area B, the exhaust passage structure of the internal combustion engine 100 is configured such that the relationship of the following equation is established. In the following equation, "N" is the number of the exhaust valves 8 of one cylinder, "D" is the diameter of the exhaust port inlet, and "B/A" is the ratio of the narrowed cross-sectional area B with respect to the reference passage cross-sectional area A.

$$A = N \times D^2 \times \pi / 4 \quad (1)$$

$$0.5 \leq (B/A) \leq 1.0 \quad (2)$$

Further, it is more preferable that the exhaust passage structure of the internal combustion engine 100 be configured such that the relationship of the following equation (3) is established.

$$0.7 \leq B/A \leq 1.0 \quad (3)$$

3. Action and Effect of Internal Combustion Engine of Embodiment

In the exhaust passage structure of the internal combustion engine 100 that includes the first narrowed portion 125 and the second narrowed portion 145 that satisfy the above conditions, as compared with an exhaust passage structure according to a comparative example that does not include these narrowed portions, the cylinder pressure can be reduced in the latter half of the exhaust stroke. This action will be described in more detail.

Figure 2:
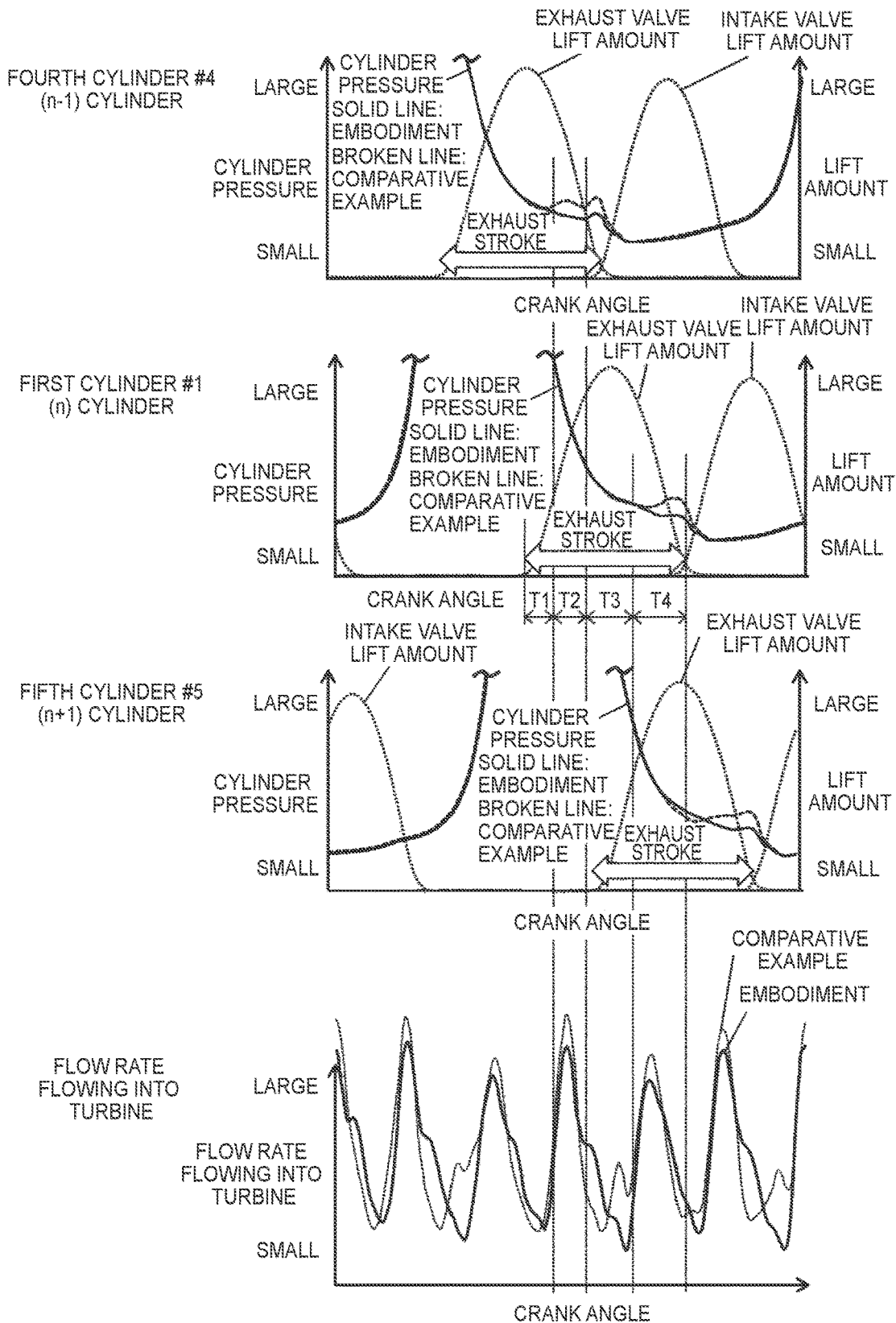
FIG. 2 is diagrams illustrating an action of a narrowed portion in the internal combustion engine according to the embodiment.

FIG. 2 is diagrams illustrating an action of a narrowed portion in the internal combustion engine according to the embodiment. The top diagram shows changes in the intake valve lift amount, the exhaust valve lift amount, and the cylinder pressure with respect to the crank angle in the fourth cylinder #4 ((n−1) cylinder) that is a cylinder in which combustion is performed immediately before the first cylinder #1 ((n) cylinder). The second diagram from the top shows changes in the intake valve lift amount, the exhaust valve lift amount, and the cylinder pressure with respect to the crank angle in the first cylinder #1 ((n) cylinder). The third diagram from the top shows changes in the intake valve lift amount, the exhaust valve lift amount, and the cylinder pressure with respect to the crank angle in the fifth cylinder #5 ((n+1) cylinder) that is a cylinder in which combustion is performed immediately after the first cylinder #1 ((n) cylinder). The bottom diagram shows a change in the flow rate of the exhaust gas flowing into the turbine 32 (flow rate flowing into turbine) with respect to the crank angle. In FIG. 2, the change in the cylinder pressure or the flow rate flowing into turbine of the exhaust passage structure provided with the first narrowed portion 125 and the second narrowed portion 145 according to the embodiment is shown by a solid line. The change in the cylinder pressure or the flow rate flowing into turbine of the exhaust passage structure according to the comparative example that is not provided with the first narrowed portion 125 and the second narrowed portion 145 is shown by a broken line.

As shown in FIG. 2, in the T1 section that is the initial stage of the exhaust stroke of the first cylinder #1, since the exhaust valve lift amount of the own cylinder is small, the flow rate of the exhaust gas flowing from the first cylinder #1 to the first merging passage 122 is low. Therefore, in the T1 section, the influence of providing the first narrowed portion 125 is small.

In the T2 section of the exhaust stroke where the exhaust valve of the first cylinder #1 is lifted up toward the maximum lift amount, both the exhaust valve 8 of the first cylinder #1 and the exhaust valve 8 of the fourth cylinder #4 in which combustion is performed earlier than the first cylinder #1 are open. In the T2 section, since the cylinder pressure of the first cylinder #1 is high, the exhaust gas flow rate of the fourth cylinder #4 in which combustion is performed earlier than the first cylinder #1 is suppressed in the comparative example of FIG. 2, thereby causing the exhaust loss in the fourth cylinder #4 to increase. Since the cylinder pressure is high in the first cylinder #1, the influence of increasing the exhaust loss is small. Further, as shown in FIG. 2, since the exhaust valves of the first cylinder #1 and the fourth cylinder #4 are open in the T2 section, the flow rate flowing into turbine is large.

In the T3 section of the exhaust stroke in which the exhaust valve of the first cylinder #1 has the maximum lift amount, the exhaust valve 8 of the fourth cylinder #4 is closed, so that only the exhaust valve 8 of the first cylinder #1 is open. Therefore, as shown in FIG. 2, the flow rate flowing into turbine in the T3 section is reduced, and the turbine 32 does not cause a large pressure loss. Therefore, as shown in FIG. 2, in the T3 section, the influence on the increase in the cylinder pressure by providing the first narrowed portion 125 in the first merging passage 122 is small.

In the T4 section of the exhaust stroke in which the exhaust valve of the first cylinder #1 is lifted down for closing the valve, both the exhaust valve 8 of the first cylinder #1 and the exhaust valve 8 of the fifth cylinder #5 in which combustion is performed later than the first cylinder #1 are open. In the T4 section, the cylinder pressure of the first cylinder #1 is lower than the cylinder pressure of the fifth cylinder #5. Therefore, in the comparative example shown by the broken line in FIG. 2, emissions of the exhaust gas from the first cylinder #1 are hindered by emissions (inflow) of the exhaust gas from the fifth cylinder #5, resulting in an increase in the cylinder pressure of the first cylinder #1. As described above, in the internal combustion engine according to the comparative example, the exhaust loss increases in the T4 section of the exhaust stroke, resulting in a decrease in output and a deterioration in fuel efficiency.

On the other hand, in the exhaust passage structure of the internal combustion engine 100 according to the embodiment, since the second narrowed portion 145 is provided in the second merging passage 142, the exhaust gas flowing from the fifth cylinder #5 to the turbine 32 is reduced as compared with that in the exhaust passage structure according to the comparative example. As a result, as shown by the solid line in FIG. 2, the increase in the cylinder pressure of the first cylinder #1 is suppressed.

Figure 3:
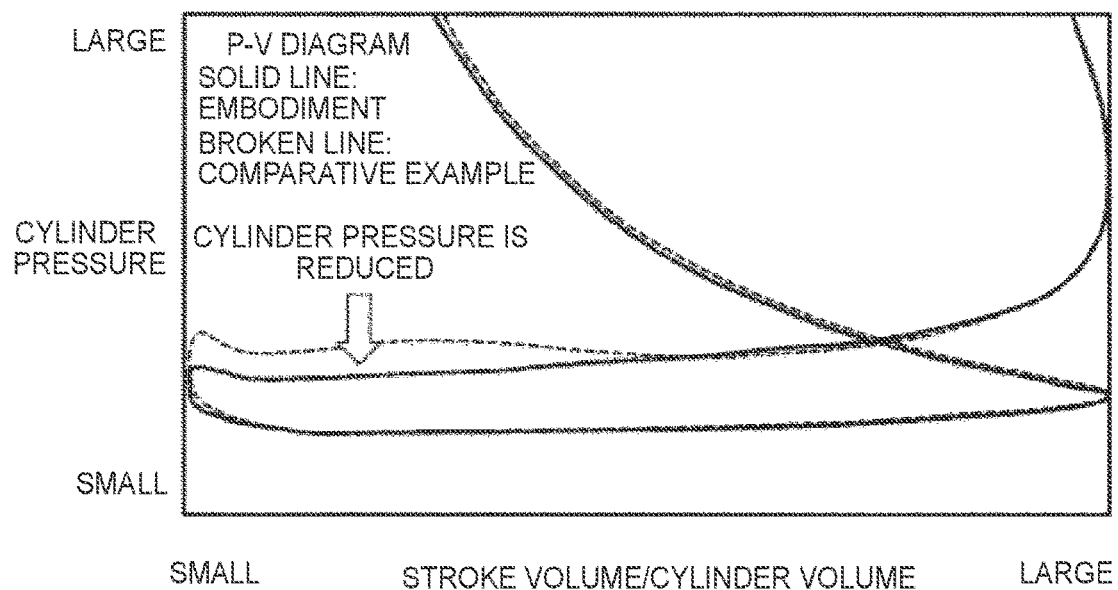
FIG. 3 is a pressure-volume (P-V) diagram showing a change in cylinder pressure in a combustion stroke of the internal combustion engine.
Figure 4:
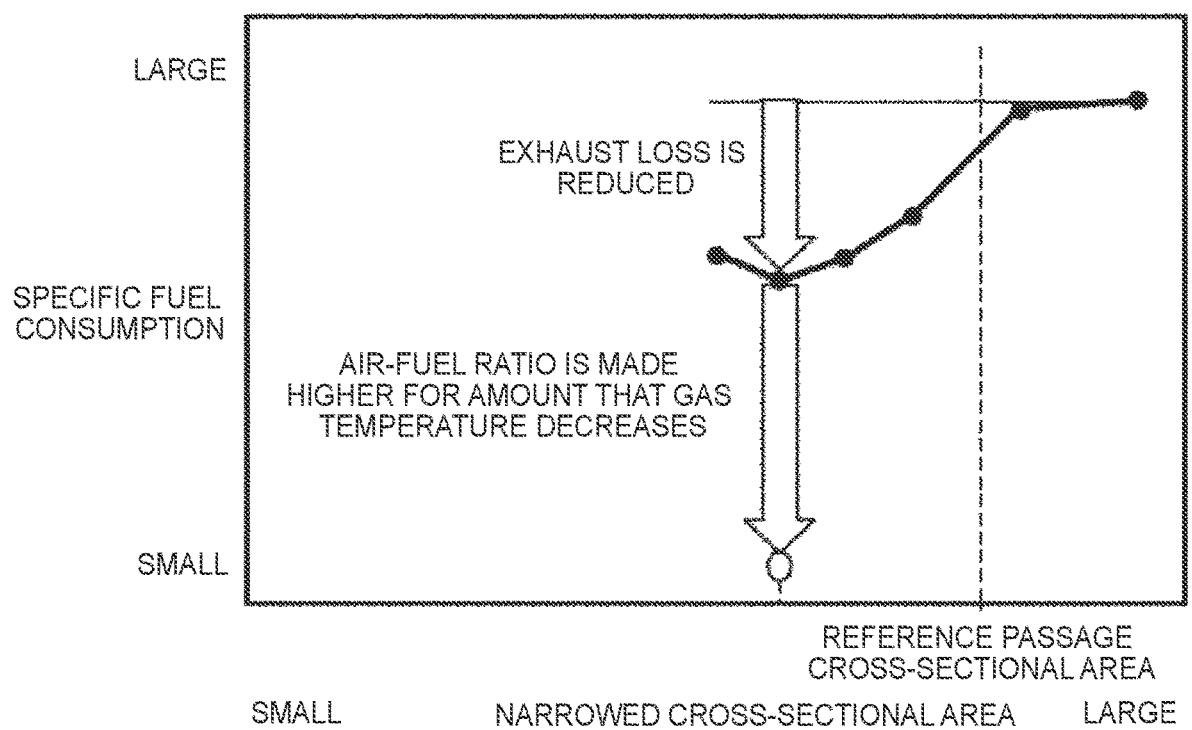
FIG. 4 is a schematic view showing a relationship between a narrowed cross-sectional area and specific fuel consumption.

FIG. 3 is a pressure-volume (P-V) diagram showing a change in the cylinder pressure in a combustion stroke of the internal combustion engine. In FIG. 3, the change in the cylinder pressure of the exhaust passage structure according to the comparative example is shown by a broken line, and the change in the cylinder pressure of the exhaust passage structure according to the embodiment is shown by a solid line. As shown in FIG. 3, it can be understood that in the exhaust passage structure according to the embodiment, the cylinder pressure in the exhaust stroke is reduced as compared with that in the exhaust passage structure according to the comparative example, resulting in a decrease in the exhaust loss. FIG. 4 is a schematic view showing a relationship between a narrowed cross-sectional area and the specific fuel consumption. As shown in FIG. 4, when the narrowed cross-sectional area B is made smaller than the reference passage cross-sectional area A, the specific fuel consumption can be reduced due to a decrease in the exhaust loss. Further, the gas temperature decreases with the decrease in the cylinder pressure in the exhaust stroke, so that the air-fuel ratio can be further higher. As a result, the specific fuel consumption can be further reduced.

As described above, with the internal combustion engine 100 according to the embodiment, it is possible to suppress the increase in the cylinder pressure in the T4 section that is a latter half of the exhaust stroke. This makes it possible to suppress a decrease in output and a deterioration in fuel efficiency while suppressing the exhaust interference.

4. Modification

The exhaust passage structure applied to the internal combustion engine 100 according to the embodiment may adopt a form modified as follows.

4-1. Structure of Turbine 32

Figure 5:
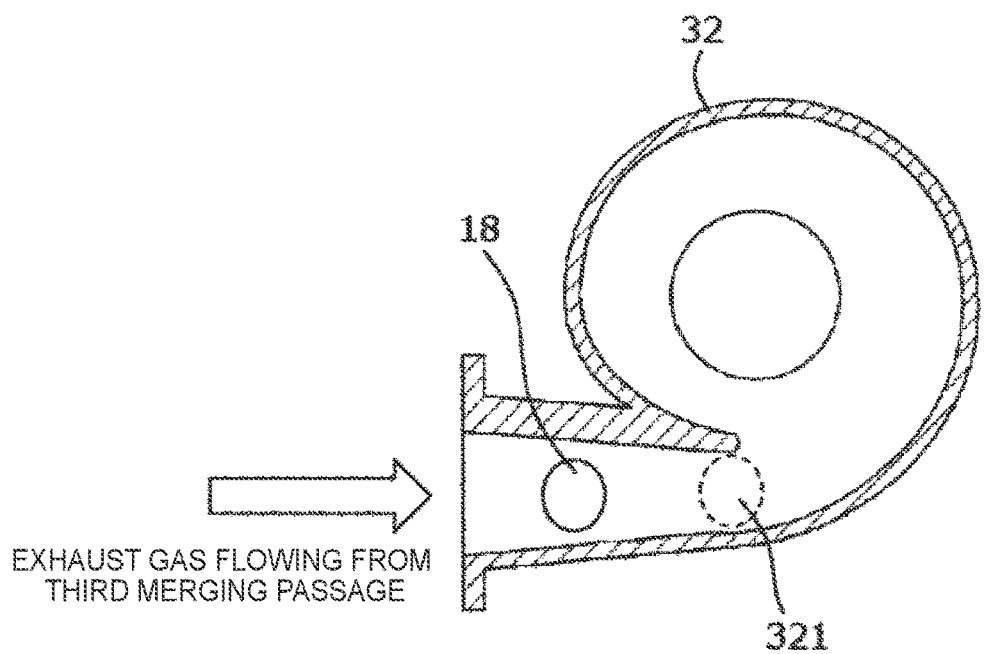
FIG. 5 is a cross-sectional view of a turbine applicable to an exhaust passage structure according to a modification.

FIG. 5 is a cross-sectional view of a turbine applicable to an exhaust passage structure according to a modification. In the example shown in FIG. 5, the turbine 32 is configured such that an inlet cross-sectional area of an inlet portion 321 of a turbine scroll is larger than the reference passage cross-sectional area A. With this configuration, the exhaust gas easily circulates through the turbine even at a low pressure, so that inflow of the exhaust gas from the first merging passage 122 to the second merging passage 142, or from the second merging passage 142 to the first merging passage 122 is suppressed. Thereby, it is possible to suppress the exhaust interference between the exhaust gas in the first merging passage 122 and the exhaust gas in the second merging passage 142.

4-2. Arrangement of First Narrowed Portion 125 and Second Narrowed Portion 145

The position of the first narrowed portion 125 is not limited as long as it is disposed in the middle of the first merging passage 122. Further, the position of the second narrowed portion 145 is not limited as long as it is disposed in the middle of the second merging passage 142. However, the exhaust pipe pressure on the exhaust upstream side of the first narrowed portion 125 and the second narrowed portion 145 temporarily rises when the gas flow rate is large. Therefore, when the pressure rise is too large, the closed exhaust valve 8 may open.

Figure 6:
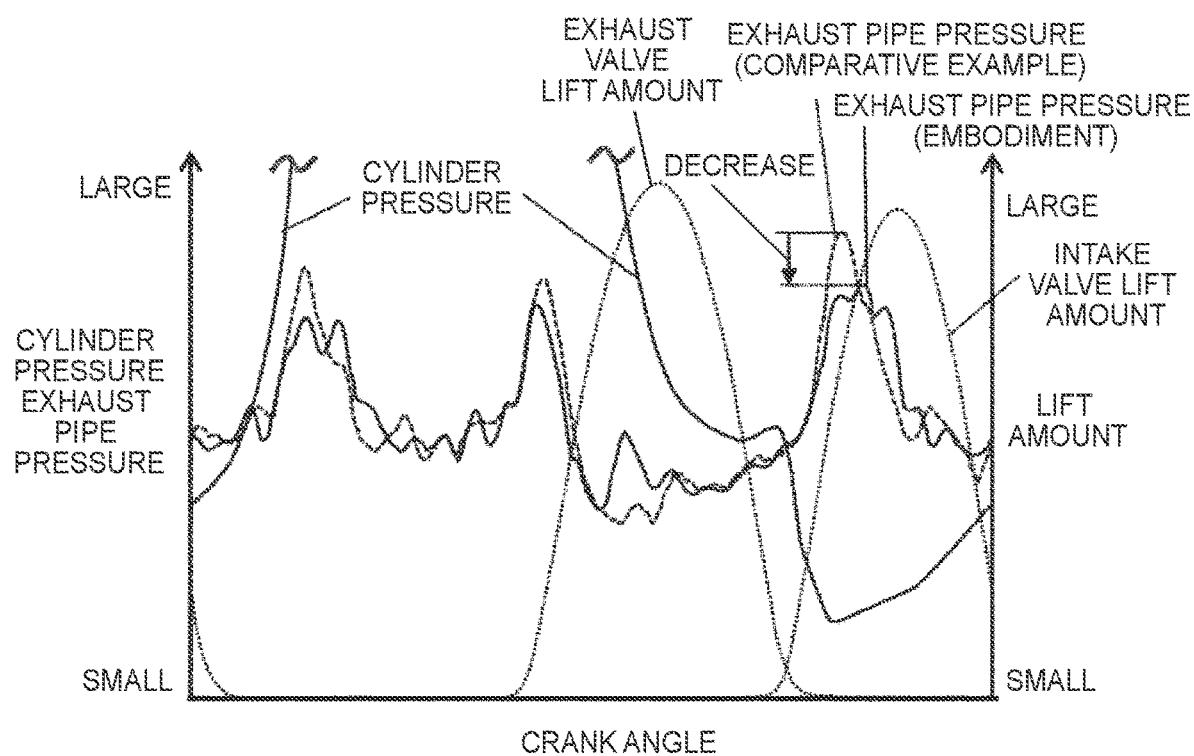
FIG. 6 is a diagram illustrating a relationship between an arrangement of a first narrowed portion and a second narrowed portion and exhaust pipe pressure.

Therefore, it is preferable that the first narrowed portion 125 and the second narrowed portion 145 be arranged on the exhaust downstream side as much as possible. FIG. 6 is a diagram illustrating a relationship between an arrangement of the first narrowed portion and the second narrowed portion and the exhaust pipe pressure. As shown in FIG. 6, it is understood that when the first narrowed portion 125 and the second narrowed portion 145 are arranged on the exhaust downstream side of the first merging passage 122 and the second merging passage 142, the exhaust pipe pressure is reduced as compared with a case where the first narrowed portion 125 and the second narrowed portion 145 are arranged on the exhaust upstream side. By arranging the first narrowed portion 125 and the second narrowed portion 145 on the exhaust downstream side as much as possible as described above, the exhaust passage volume from the exhaust valve 8 to the first narrowed portion 125 and the second narrowed portion 145 can be increased as much as possible. As a result, it is possible to suppress a temporary pressure rise on the exhaust upstream side, so that unintentional opening of the exhaust valve 8 can be suppressed.

Further, the first merging passage 122 and the second merging passage 142 on the exhaust upstream side of the first narrowed portion 125 and the second narrowed portion 145 may be configured such that the passage cross-sectional areas are gradually reduced toward the exhaust downstream side. With this configuration, it is possible to increase the exhaust passage volume on the exhaust upstream side of the first narrowed portion 125 and the second narrowed portion 145 while suppressing the exhaust resistance.

4-3. Exhaust Valve Lift Speed and Maximum Lift Position

The lift speed or the maximum lift position of the exhaust valve 8 is not limited. However, the lift speed of the exhaust valve 8 is preferably slower on the opening side than on the closing side. Alternatively, the maximum lift position of the exhaust valve 8 is preferably on the closing side with respect to the intermediate position between the valve opening start position and the valve closing completion position of the exhaust valve 8.

Figure 7:
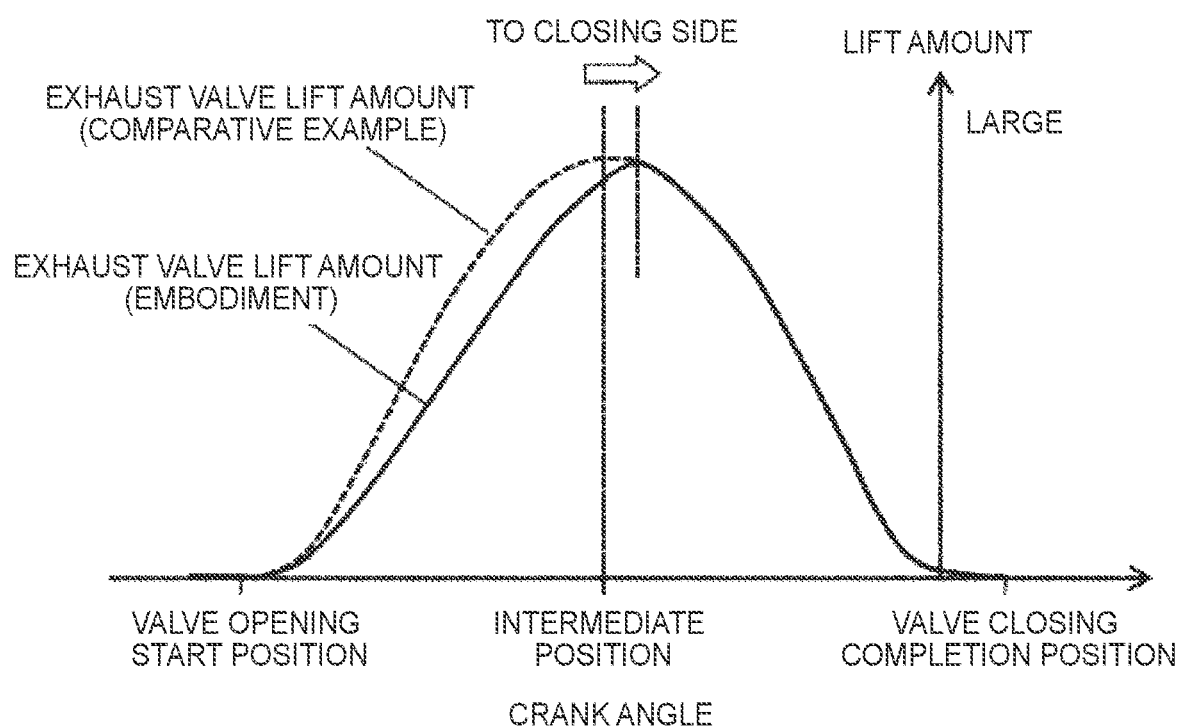
FIG. 7 is a diagram showing an example of a lift speed and a maximum lift position of an exhaust valve.

FIG. 7 is a diagram showing an example of the lift speed and the maximum lift position of the exhaust valve. As shown in the example shown in FIG. 7, when the lift speed of the exhaust valve 8 on the opening side is slower than the lift speed of the exhaust valve 8 on the closing side, the exhaust gas flow rate at the initial stage of the exhaust stroke decreases. Further, the exhaust gas flow rate at the initial stage of the exhaust stroke also decreases when the maximum lift position of the exhaust valve 8 is set to the closing side with respect to the intermediate position. Such exhaust characteristics can be realized, for example, by setting a cam profile of the exhaust valve 8. With this configuration, it is possible to reduce the exhaust gas flow rate flowing from the first merging passage 122 to the second merging passage 142 in the exhaust stroke of the first cylinder group 61, or the exhaust gas flow rate flowing from the second merging passage 142 to the first merging passage 122 in the exhaust stroke of the second cylinder group 62. As a result, it is possible to suppress a temporary pressure rise on the exhaust upstream side, so that unintentional opening of the exhaust valve 8 can be suppressed.

4-4. Internal Combustion Engine

In the embodiment described above, the straight-six internal combustion engine 100 has been described as an example in which the exhaust gas from each cylinder is collected in the order of the sixth cylinder #6, the second cylinder #2, and the first cylinder #1, but the internal combustion engine to which the exhaust passage structure of the present disclosure can be applied is not limited to this. That is, as long as the internal combustion engine is configured such that the exhaust gas from a plurality of cylinders is gathered in one exhaust passage by two steps and guided to the turbine, for example, a straight-four engine can be adopted in which the exhaust gas is gathered in the order of the fourth cylinder #4, the second cylinder #2, and the first cylinder #1 to be guided to the turbine. Further, the number of exhaust valves 8 of the internal combustion engine 100 is not limited.

What is claimed is:

1. An exhaust passage structure of an internal combustion engine provided with a turbocharger, the internal combustion engine including a first cylinder group that includes a first plurality of cylinders and a second cylinder group that includes a second plurality of cylinders different from the first plurality of cylinders, each cylinder including at least one exhaust port, the exhaust passage structure comprising:
    a first multiple branch passage including a plurality of first branch passages each respectively connected to the at least one exhaust port of each cylinder of the first cylinder group, and a first gathering portion in which exhaust gas flowing through the plurality of first branch passages gathers in one location;
    a first merging passage extending from the first gathering portion to an exhaust downstream side, the first merging passage including a narrowed portion with a passage cross-sectional area;
    a second multiple branch passage including a plurality of second branch passages each respectively connected to the at least one exhaust port of each cylinder of the second cylinder group, and a second gathering portion in which exhaust gas flowing through the plurality of second branch passages gathers in one location;
    a second merging passage extending from the second gathering portion to an exhaust downstream side, the second merging passage including a narrowed portion with a passage cross-sectional area;
    a third gathering portion in which the exhaust gas flowing through the first merging passage and the exhaust gas flowing through the second merging passage gather; and
    a third merging passage connecting the third gathering portion to a turbine of the turbocharger, wherein:
    a narrowed cross-sectional area represents the passage cross-sectional area of the narrowed portion of one of the first merging passage or the second merging passage;
    a reference passage cross-sectional area represents a total cross-sectional area of the at least one exhaust port of one cylinder of the first cylinder group or the second cylinder group;
    a ratio of the narrowed cross-sectional area to the reference passage cross-sectional area is at least 0.5 and at most 1.0; and
    an inlet cross-sectional area of an inlet of a turbine scroll of the turbine is configured to be greater than the reference passage cross-sectional area.

2. The exhaust passage structure according to claim 1, wherein the ratio of the narrowed cross-sectional area to the reference passage cross-sectional area is at least 0.7 and at most 1.0.

3. The exhaust passage structure according to claim 1, wherein the narrowed portions of the first merging passage and the second merging passage are provided in respective exhaust downstream ends of the first merging passage and the second merging passage.

4. The exhaust passage structure according to claim 1, wherein the first merging passage and the second merging passage are configured such that the passage cross-sectional areas are gradually reduced from an exhaust upstream side toward the narrowed portions.

5. An exhaust passage structure of an internal combustion engine provided with a turbocharger, the internal combustion engine including a first cylinder group that includes a first plurality of cylinders and a second cylinder group that includes a second plurality of cylinders different from the first plurality of cylinders, each cylinder including at least one exhaust port, the exhaust passage structure comprising:
    a first multiple branch passage including a plurality of first branch passages each respectively connected to the at least one exhaust port of each cylinder of the first cylinder group, and a first gathering portion in which exhaust gas flowing through the plurality of first branch passages gathers in one location;
    a first merging passage extending from the first gathering portion to an exhaust downstream side, the first merging passage including a narrowed portion with a passage cross-sectional area;
    a second multiple branch passage including a plurality of second branch passages each respectively connected to the at least one exhaust port of each cylinder of the second cylinder group, and a second gathering portion in which exhaust gas flowing through the plurality of second branch passages gathers in one location;
    a second merging passage extending from the second gathering portion to an exhaust downstream side, the second merging passage including a narrowed portion with a passage cross-sectional area;
    a third gathering portion in which the exhaust gas flowing through the first merging passage and the exhaust gas flowing through the second merging passage gather; and
    a third merging passage connecting the third gathering portion to a turbine of the turbocharger, wherein:
    a narrowed cross-sectional area represents the passage cross-sectional area of the narrowed portion of one of the first merging passage or the second merging passage;
    a reference passage cross-sectional area represents a total cross-sectional area of the at least one exhaust port of one cylinder of the first cylinder group or the second cylinder group;
    a ratio of the narrowed cross-sectional area to the reference passage cross-sectional area is at least 0.5 and at most 1.0; and
    the internal combustion engine is configured such that a lift speed of an exhaust valve on an opening side is slower than a lift speed of the exhaust valve on a closing side.

6. An exhaust passage structure of an internal combustion engine provided with a turbocharger, the internal combustion engine including a first cylinder group that includes a first plurality of cylinders and a second cylinder group that includes a second plurality of cylinders different from the first plurality of cylinders, each cylinder including at least one exhaust port, the exhaust passage structure comprising:
- a first multiple branch passage including a plurality of first branch passages each respectively connected to the at least one exhaust port of each cylinder of the first cylinder group, and a first gathering portion in which exhaust gas flowing through the plurality of first branch passages gathers in one location;
- a first merging passage extending from the first gathering portion to an exhaust downstream side, the first merging passage including a narrowed portion with a passage cross-sectional area;
- a second multiple branch passage including a plurality of second branch passages each respectively connected to the at least one exhaust port of each cylinder of the second cylinder group, and a second gathering portion in which exhaust gas flowing through the plurality of second branch passages gathers in one location;
- a second merging passage extending from the second gathering portion to an exhaust downstream side, the second merging passage including a narrowed portion with a passage cross-sectional area;
- a third gathering portion in which the exhaust gas flowing through the first merging passage and the exhaust gas flowing through the second merging passage gather; and
- a third merging passage connecting the third gathering portion to a turbine of the turbocharger, wherein:
- a narrowed cross-sectional area represents the passage cross-sectional area of the narrowed portion of one of the first merging passage or the second merging passage;
- a reference passage cross-sectional area represents a total cross-sectional area of the at least one exhaust port of one cylinder of the first cylinder group or the second cylinder group;
- a ratio of the narrowed cross-sectional area to the reference passage cross-sectional area is at least 0.5 and at most 1.0; and
- the internal combustion engine is configured such that a maximum lift position of an exhaust valve is on a closing side with respect to an intermediate position between a valve opening start position and a valve closing completion position of the exhaust valve.

\* \* \* \* \*